US012597856B2

(12) United States Patent
Mukhopadhyay et al.

(10) Patent No.: US 12,597,856 B2
(45) Date of Patent: Apr. 7, 2026

(54) SYSTEMS AND METHODS FOR POWERING DRIVER CIRCUITRY

(71) Applicant: Maxim Integrated Products, Inc., San Jose, CA (US)

(72) Inventors: Rajdeep Mukhopadhyay, Edinburgh (GB); Christopher Francis Edwards, Sunnyvale, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 417 days.

(21) Appl. No.: 18/060,909

(22) Filed: Dec. 1, 2022

(65) Prior Publication Data

US 2023/0216396 A1 Jul. 6, 2023

Related U.S. Application Data

(60) Provisional application No. 63/266,297, filed on Dec. 31, 2021.

(51) Int. Cl.
H02M 3/07 (2006.01)
H02M 1/00 (2006.01)
H02M 1/08 (2006.01)

(52) U.S. Cl.
CPC ........... H02M 3/07 (2013.01); H02M 1/0006 (2021.05); H02M 1/08 (2013.01)

(58) Field of Classification Search
CPC ....................................................... H02M 3/07
See application file for complete search history.

(56) References Cited

U.S. PATENT DOCUMENTS

| | | | | |
|---|---|---|---|---|
| 10,536,140 | B1 * | 1/2020 | Ribarich | H03K 17/0822 |
| 2015/0188425 | A1 * | 7/2015 | Chang | H02M 3/158 |
| | | | | 323/271 |
| 2018/0145668 | A1 * | 5/2018 | Chan | H03K 17/08122 |
| 2021/0126538 | A1 * | 4/2021 | Puia | H02M 3/158 |

FOREIGN PATENT DOCUMENTS

| | | | | | |
|---|---|---|---|---|---|
| CN | 111049100 | A | * | 4/2020 | H02H 3/20 |
| JP | 2014023269 | A | * | 2/2014 | |

OTHER PUBLICATIONS

Park et al., High Frequency LDMOS in 0.18um BCD Technology for Power Supply-On-Chip, PWRSCON'12, Nov. 16, 2012, 20 pages.

* cited by examiner

Primary Examiner — Jeffrey A Gblende
Assistant Examiner — Jye-June Lee
(74) Attorney, Agent, or Firm — DLA Piper LLP (US)

(57) ABSTRACT

A method for powering driver circuitry for an upper transistor of a half-bridge switching stage includes (1) selectively charging a boot-strap capacitor via a first voltage source such that a voltage at the boot-strap capacitor remains within a predetermined voltage range, (2) clamping the voltage at the boot-strap capacitor to prevent the voltage at the boot-strap capacitor from exceeding a predetermined maximum value, and (3) electrically powering the driver circuitry at least partially via the boot-strap capacitor.

20 Claims, 8 Drawing Sheets

-Prior Art-

-Prior Art-

500

322

330 — Charging Control Circuitry 502

Clamping Circuitry 504

Φ1 — 306 — $V_{g1}$  G  D  302

$V_{drv1}$ $i_4$ $V_c$ ← 310

+ 
− 316  $V_s$
+ 
−

319

S

334

312

$V_x$  $i_3$  328

324

$i_1$

314

$i_{sense}$ 332  304

318 — + − $V_{drv2}$  Φ2 — 308 — $V_{g2}$  G  D $i_2$

S

326

Φ1  Φ2

Controller 320

600

Magnitude $V_{drv1\_max}$ $V_{drv1}$ $V_{drv1\_min}$

Time $t_0$    $t_1$    $t_2$    $t_3$

1100

1200

1400

SYSTEMS AND METHODS FOR POWERING DRIVER CIRCUITRY

RELATED APPLICATIONS

This application claims benefit of priority to U.S. Provisional Patent Application No. 63/266,297, filed on Dec. 31, 2021, which is incorporated herein by reference.

BACKGROUND

A half-bridge switching stage includes two switching devices, commonly referred to as an upper switching device and a lower switching device, joined at a switching node. For example, FIG. 1 is a schematic diagram of a half-bridge switching stage 100 including an upper switching device 102 and a lower switching device 104. Upper switching device 102 is electrically coupled between a power node 106 and a switching node 108, and lower switching device 104 is electrically coupled between switching node 108 and a power node 110. Half-bridge switching stage 100 may be included, for example, in a class-D amplifier, a direct-current to direct-current (DC-to-DC) converter, an inverter, or an active rectifier.

Upper switching device 102 is controlled by a control signal $\Phi1$, and lower switching device 104 is controlled by a control signal $\Phi2$. Control signals $\Phi1$ and $\Phi2$ are generated, for example, by a controller (not shown). Control signals $\Phi1$ and $\Phi2$ are typically generated so that upper switching device 102 and lower switching device 104 repeatedly switch between their respective on and off states at a high frequency. Additionally, control signals $\Phi1$ and $\Phi2$ are usually generated in a manner which ensures that upper switching device 102 and lower switching device 104 do not simultaneously operate in their respective on states, to prevent "shoot-through" (shorting of power nodes 106 and 110 by the two switching devices).

FIG. 2 is a graph 200 illustrating one example of operation of half-bridge switching stage 100. Graph 200 includes curves representing control signal $\Phi1$, control signal $\Phi2$, and voltage $V_x$ at switching node 108. A vertical axis of graph 200 represents magnitude, and a horizontal axis of graph 200 represents time. The three curves of graph 200 are vertically offset from each other for illustrative clarity. In the FIG. 2 example, (1) each of switching devices 102 and 104 operates in its on state when its respective control signal $\Phi1$ and $\Phi2$ is logic high, (2) respective voltages of power nodes 106 and 110 are constant, and (3) voltage of power node 106 is greater than voltage of power node 110. Half-bridge switching stage 100 switches switching node 108 between power node 106 and power node 110, which causes switching node voltage $V_x$ to be a square wave, as illustrated in FIG. 2.

A plurality of half-bridge switching stages can be combined. For example, two half-bridge switching stages can be combined to form a full-bridge converter, such as for generating an alternating current (AC) waveform or for performing active rectification of an AC waveform. As another example, three half-bridge switching stages may be combined to form a three-phase inverter or to form an active rectifier for rectifying a three-phase AC input source.

DETAILED DESCRIPTION OF THE EMBODIMENTS

There have been great advances in field effect transistors (FETs). For example, modern FETs are often capable of switching at high speeds, handling high voltages and currents, and operating with low on-resistance. Additionally, FETs are compatible with many integrated circuit manufacturing processes. Consequently, half-bridge switching stages often use FETs for their upper and lower switching devices, instead of using other types of transistors such as bipolar junction transistors (BJTs) or insulated gate bipolar junction transistors (IGBTs). N-channel FETs generally have better operating characteristics than p-channel FETs of similar size and voltage rating, and half-bridge switching stages therefore frequently use n-channel FETs for both upper and lower switching devices.

Figure 1:
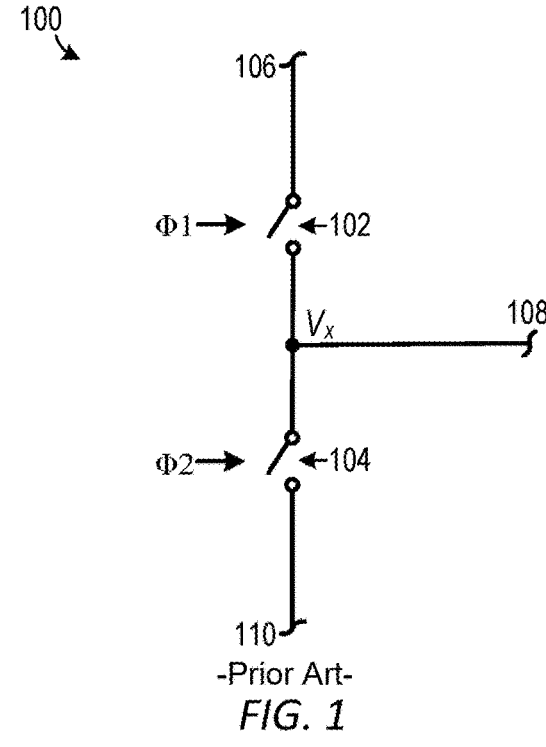
FIG. 1 is a schematic diagram of a half-bridge switching stage.
Figure 2:
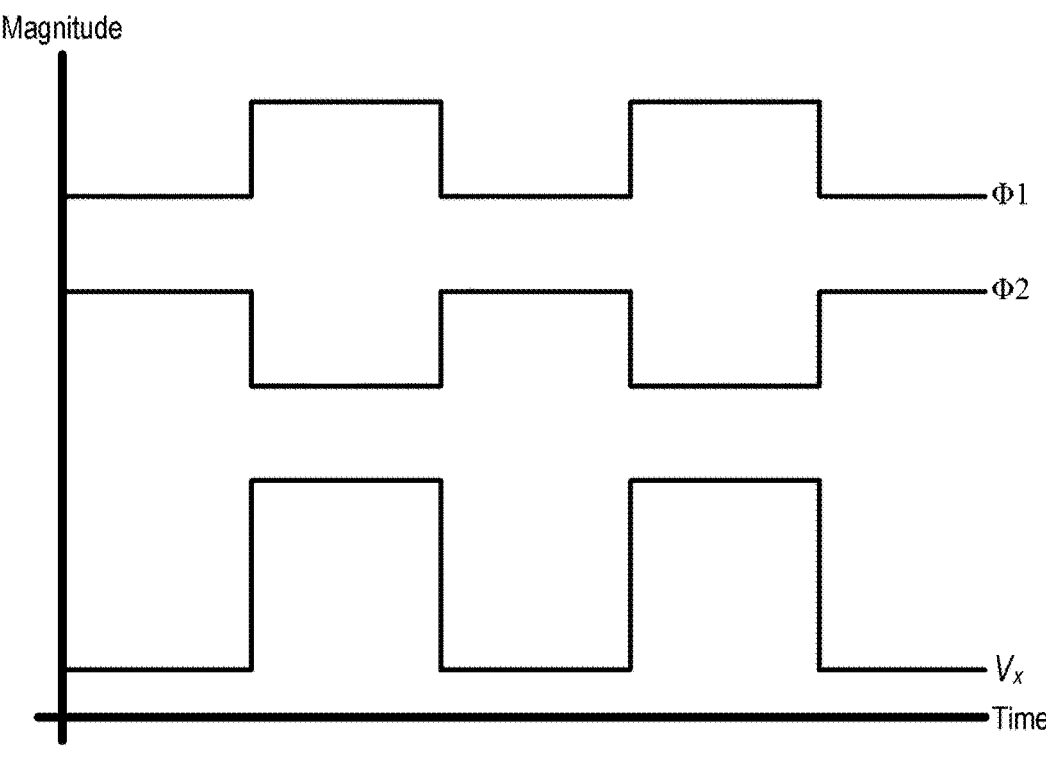
FIG. 2 is a graph illustrating one example of operation of the FIG. 1 half-bridge switching stage.
Figures 3, 4:
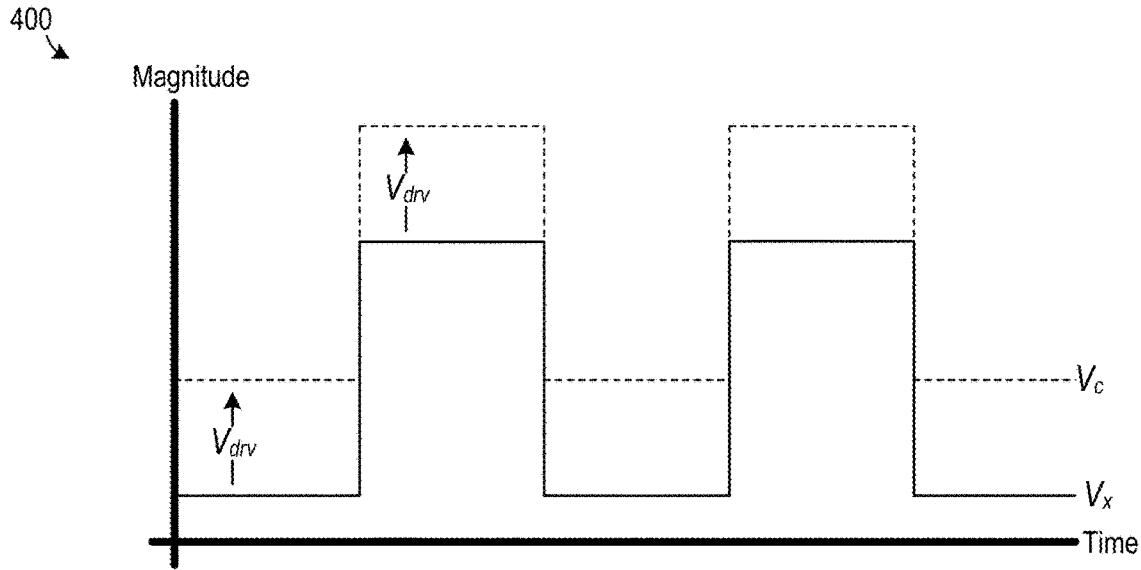
FIG. 3 is a schematic diagram of a half-bridge switching stage including n-channel field effect transistors (FETs).
FIG. 4 is a graph illustrating two waveforms in an example ideal operating scenario of the FIG. 3 half-bridge switching stage.

For example, FIG. 3 is a schematic diagram of a half-bridge switching stage 300 where an upper switching device is implemented by an n-channel FET 302 and a lower switching device is implemented by an n-channel FET 304, henceforth referred to as upper FET 302 and lower FET 304, respectively. Half-bridge switching stage 300 further includes upper driver circuitry 306, lower driver circuitry 308, a boot-strap capacitor 310, a diode 311, and a current sense resistor 312. FIG. 3 further depicts current sense circuitry 314, a voltage source 316, a voltage source 318, and a controller 320, although these elements are not necessarily part of half-bridge switch stage 300.

Each of upper FET 302 and lower FET 304 includes a drain (D), a source (S), and a gate (G). Additionally, each of upper FET 302 and lower FET 304 may include a body diode, as illustrated in FIG. 3. The drain of upper FET 302 is electrically coupled to a power node 322 (e.g., a positive voltage rail), and the source of upper FET 302 is electrically coupled to a switching node 324. The drain of lower FET 304 is electrically coupled to switching node 324, and the source of lower FET 304 is electrically coupled to a power node 326 (e.g., a negative voltage rail or ground). Unless otherwise indicated, all voltages in the following discussion of half-bridge switching stage 300 are referenced to power node 326.

Current sense resistor 312 is electrically coupled between switching node 324 and an output node 328. Current sense circuitry 314 generates a signal $i_{sense}$ representing magnitude of current $i_3$ flowing through current sense resistor 312, based on voltage across current sense resistor 312. Signal $i_{sense}$ may be either an analog signal or a digital signal.

Upper driver circuitry 306 drives the gate of upper FET 302 in response to control signal Φ1, i.e., upper driver circuitry 302 switches the gate of upper transistor 306 between a power supply rail 330 and switching node 324 in response to control signal Φ1, such that the gate of upper transistor 302 is driven to either the voltage of power supply rail 330 or the voltage of switching node 324. For example, upper driver circuitry 306 may connect the gate of upper FET 302 to power supply rail 330 in response to control signal Φ1 being asserted, and upper driver circuitry 306 may connect the gate of upper FET 302 to switching node 324 in response to control signal Φ1 being de-asserted, or vice versa. Similarly, lower driver circuitry 308 drives the gate of lower FET 304 in response to control signal Φ2, i.e., lower driver circuitry 308 switches the gate of lower transistor 304 between a power supply rail 332 and power node 326 in response to control signal Φ2, such that the gate of lower transistor 304 is driven to either the voltage of power supply rail 332 or the voltage of power node 326. For example, lower driver circuitry 308 may connect the gate of lower FET 304 to power supply rail 332 in response to control signal Φ2 being asserted, and lower driver circuitry 308 may connect the gate of lower FET 304 to power node 326 in response to control signal Φ2 being de-asserted, or vice versa. Controller 320 generates control signals Φ1 and Φ2, for example, using a pulse width modulation (PWM) technique or a pulse frequency modulation (PFM) technique.

A gate-to-source voltage ($V_{gs}$) of an n-channel FET must exceed a threshold voltage for the FET to reliably turn on. On the flip side, a $V_{gs}$ of an N-channel FET must not exceed a maximum gate-to-source voltage rating of the FET to prevent damaging the FET, such as by causing failure of a gate oxide of the FET. Consequently, power supply voltage $V_{drv1}$ for upper driver circuitry 306, i.e., a difference between voltage of power supply rail 330 and voltage of switching node 324, must be within a specified range for upper FET 302. Similarly, power supply voltage $V_{drv2}$ for lower driver circuitry 308, i.e., a difference between voltage of power supply rail 332 and voltage of power node 326, must be within a specified range for lower FET 304. In some applications, the permissible range(s) of power supply voltages $V_{drv1}$ and $V_{drv2}$ may be relatively narrow, e.g., between 1.5 volts and 2.2 volts, such as when using FETs with thin gate oxide layers.

It is relatively simple to achieve an acceptable power supply voltage $V_{drv2}$ for lower driver circuitry 308 because power supply voltage $V_{drv2}$ is referenced to power node 326, which typically has a fixed voltage. Consequently, power supply voltage $V_{drv2}$ will be equal to a voltage of voltage source 318, and voltage source 318 can be configured to provide a desired value of power supply voltage $V_{drv2}$. It is more complicated, however, to achieve an acceptable power supply voltage $V_{drv1}$ for upper driver circuitry 306 because power supply voltage $V_{drv1}$ is referenced to switching node 324, and a voltage $V_x$ of switching node 316 varies with switching of upper FET 302 and lower FET 304.

Therefore, half-bridge switching stage 300 includes boot-strap capacitor 310 to serve as a power source for upper driver circuitry 306 that is referenced to switching node 324, instead of being referenced to power node 326. In this document, a boot-strap capacitor is a capacitor that is electrically coupled to a switching node of a half-bridge switching stage to help provide an electrical power source that is referenced to the switching node, for powering driver circuitry of the switching stage. For example, boot strap capacitor 310 is electrically coupled between a power supply rail 330 and switching node 324 via current sense resistor 312. Boot strap capacitor 310 is charged via voltage source 316 and diode 311 when lower FET 304 operates in its on-state, to generate power supply rail 330 for upper driver circuitry 306. Voltage source 316 is electrically coupled between diode 311 and a node 319. Diode 311 could be replaced with a switching device that is controlled, for example, to (1) operate in its on-state when lower FET 304 operates in its on-stage and (b) operate in its off-state when lower FET 304 operates in its off-state. Under ideal conditions, magnitude of power supply voltage $V_{drv1}$ remains approximately equal to the voltage $V_s$ of voltage source 316 minus a voltage drop across diode 311 (or minus a voltage drop across a switching device replacing diode 311), thereby providing a stable power supply for upper driver circuitry 306 that is referenced to switching node 324. Power supply voltage $V_{drv1}$ is the same voltage $V_c$ across boot-strap capacitor 310 neglecting voltage drop across current sense resistor 312. In this document, the term "voltage at boot-strap capacitor 310" may mean either voltage $V_{drv1}$ or voltage $V_c$.

FIG. 4 is graph 400 illustrating an example of two voltages of half-bridge switching stage 300 under ideal conditions, i.e., where (1) lower FET 304 has negligible on-resistance, (2) there is negligible voltage drop across current sense resistor 312, and (3) negligible current flows between the gate of upper FET 302 and driver circuitry 306 during switching of upper FET 302. Graph 400 includes curves representing voltage $V_x$ of switching node 324 and voltage $V_c$ across boot-strap capacitor 310. As evident from graph 400, both voltages $V_x$ and $V_x$ are square waves. However, under the ideal conditions discussed above, magnitude of power supply voltage $V_{drv1}$ is equal to $V_c - V_x$, and magnitude of $V_{drv1}$ therefore remains constant despite changes in voltage $V_x$ and $V_c$, as illustrated in FIG. 4.

Unfortunately, a realistic implementation of half-bridge switching stage 300 will not operate according to the ideal conditions discussed above, and magnitude of power supply voltage $V_{drv1}$ may therefore vary. For example, on-resistance of lower FET 304 may cause variation in voltage $V_{drv1}$, due to voltage drop across lower FET 304 when the FET is in its on-state. In particular, assuming negligible voltage drop across current sense resistor 312, voltage $V_{drv1}$ is given by EQN. 1 below, where $i_2$ is current through lower FET 304 and $R_{ds-on}$ is drain-to-source on resistance of lower FET 304. Assume, for example, that power supply voltage $V_{drv1}$ must be between 1.5 volts and 2.2 volts based on gate drive requirements for upper FET 302, and voltage $V_s$ is set approximately to the middle of this range at 1.8 volts. Additionally, assume that $R_{ds-on}$ is 0.1 ohm and that $i_2$ is 6 amperes. Under these conditions, $V_{drv1}$ will be 2.4 volts, as can be determined from EQN. 1. Consequently, the maximum permissible gate-to-source voltage for upper FET 302 will be exceeded under these conditions. Now assume that $R_{ds-on}$ is 0.1 ohm and that $i_2$ is –6 amperes. It can be determined from EQN. 1 that $V_{drv1}$ will be 1.2 volts under these conditions, and gate-to-source voltage for upper FET 302 will therefore be below a minimum value required to guarantee that lower FET 302 will turn on. Accordingly, on-resistance of lower FET 304 may cause magnitude of power supply voltage $V_{drv1}$ to be outside of its specified range, even if voltage $V_s$ is set to approximately the middle of the specified range.

$$V_{drv1}=V_s+(i_2)(R_{ds-on}) \qquad \text{(EQN. 1)}$$

It should be noted that negative effects of lower FET 304 on-resistance on power supply voltage $V_{drv1}$ will be pronounced at high operating temperatures because FET on-resistance generally increases with operating temperature. For example, on-resistance of a FET at high temperature may be approximately double on-resistance of the FET at room temperature. Additionally, lower FET 304 may be sized for average load of half-bridge switching stage 300, instead being sized for peak load of half-bridge switching stage 300, which increases likelihood of $V_{drv1}$ being out of its specified range due to on-resistance of lower FET 304. The effects of lower FET 304 on-resistance on power supply voltage $V_{drv1}$ can be mitigated by increasing the size of FET 304 to reduce its on-resistance. However, it is generally undesirable to increase FET size due to space and cost constraints, particularly in applications where average load current is significantly less than peak load current.

Furthermore, voltage drop across current sense resistor 312 may cause voltage $V_{drv1}$ to be outside of its specified range. Specifically, while resistance of current sense resistor 312 would not affect magnitude of $V_{drv1}$ if current $i_3$ remains constant during charging and discharging of boot-strap capacitor 310, current $i_3$ will not remain constant under realistic operating conditions of half-bridge switching stage 300. Accordingly, current sense resistor 312 will typically affect voltage $V_{drv1}$ as approximated by EQN. 2 below, where R is resistance of current sense resistor 312. Assume, for example, that R is equal to 0.1 ohm, $i_3$ is equal to –6 amperes, and $V_c$ is equal to 1.9 volts. It can be determined from EQN. 2 that $V_{drv1}$ will be equal to 2.5 volts, which is significantly greater than the maximum permissible value of power supply voltage $V_{drv1}$, assuming that the permissible range is 1.5 to 2.2 volts as in the example above. Additionally, although not reflected in EQN. 2 below, effects of current sense resistor 312 on voltage $V_{drv1}$ increase with increasing frequency of current $i_3$ because the rate of current change increases with increasing frequency of current $i_3$.

$$V_{drv1}=V_c-(i_3)(R) \qquad \text{(EQN. 2)}$$

Negative effects of current sense resistor 312 on voltage $V_{drv1}$ can be avoided by connecting a lower terminal 334 of boot-strap capacitor 310 to switching node 324, instead of to output node 328. However, in embodiments where half-bridge switching stage 300 is partially implemented by an integrated circuit, switching node 324 may be internal to the integrated circuit and boot-strap capacitor 310 may be external to the integrated circuit. Additionally, there might not be sufficient output pins or solder bumps on the integrated circuit to allow external access to switching node 324. Therefore, it may be infeasible to connect terminal 334 directly to switching node 324, and terminal 334 may need to be electrically coupled to switching node 324 via current sense resistor 312, as illustrated in FIG. 3.

Disclosed herein are system and methods for powering driver circuitry which at least partially overcome the above-discussed problems. The new systems include charging control circuitry and clamping circuitry. The charging control circuitry is configured to selectively charge a boot-strap capacitor of a half-bridge switching stage via a voltage source such that a voltage at the boot-strap capacitor remains within a predetermined voltage range, thereby helping prevent driver circuitry power supply voltage from falling below a minimum permissible level. The clamping circuitry is configured to clamp the voltage at the boot-strap capacitor to prevent the voltage at the boot-strap capacitor from exceeding a predetermined maximum value, thereby helping prevent driver circuitry power supply voltage from rising above a maximum permissible level. As such, the new systems and methods help prevent lower FET on-resistance and current sense resistor resistance from causing driver circuitry power supply voltage to be outside of a specified permissible range.

Figures 5, 6:
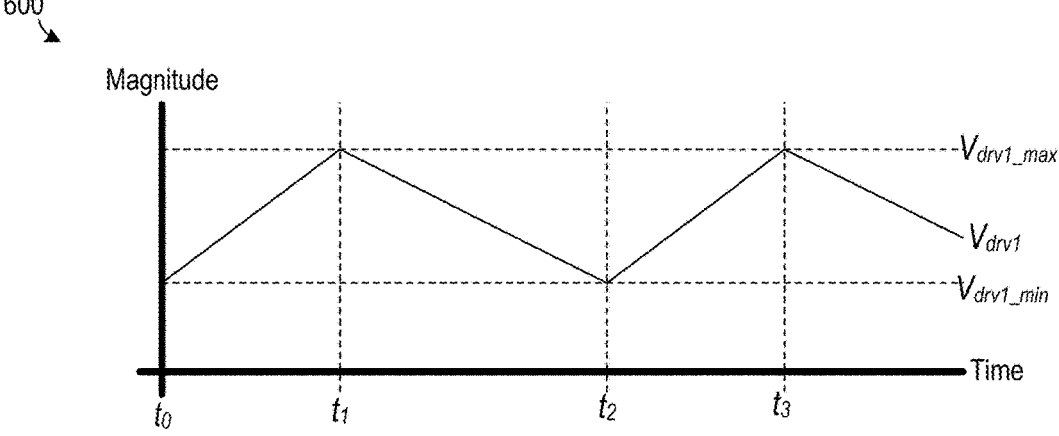
FIG. 5 is a schematic diagram of a half-bridge switching stage including a system for powering driver circuitry, according to an embodiment.
FIG. 6 is a graph illustrating an example of operation of one embodiment of charging control circuitry of the FIG. 5 half-bridge switching stage.

FIG. 5 is a block diagram of a half-bridge switching stage 500 including an embodiment of the new systems disclosed herein. Half-bridge switching stage 500 includes many of the elements of half-bridge switching stage 300 of FIG. 3. Specifically, half-bridge switching stage 500 includes upper FET 302, lower FET 304, upper driver circuitry 306, lower driver circuitry 308, boot-strap capacitor 310, and current sense resistor 312. Additionally, half-bridge switching stage 500 further includes charging control circuitry 502 and clamping circuitry 504. FIG. 5 further depicts current sense circuitry 314, voltage source 316, voltage source 318, and controller 320, although these elements are not necessarily part of half-bridge switch stage 500. Elements 302, 304, 306, 308, 310, 312, 314, 316, 318, and 320 are configured to operate in the same manner as discussed above with respect to FIG. 3. In some embodiments, voltage sources 316 and 318 are implemented by a common voltage source, instead of by different respective voltage sources. Additionally, in some embodiments, current sense resistor 312 (and associated current sense circuitry 314) are omitted. For example, in applications including multiple instances of half-bridge switching stage 500, only one instance of half-bridge switching stage 500 may require current sensing capability.

Additionally, charging control circuitry 502 is configured to monitor voltage $V_{drv1}$, or voltage $V_c$ across boot-strap capacitor 310, to control charging of boot-strap capacitor 310 from voltage source 316 such that $V_{drv1}$ or voltage $V_c$, remains within a predetermined voltage range. The predetermined voltage range is selected, for example, to at least substantially coincide with a range of $V_{gs}$ of upper FET 302 which guarantees that upper FET 302 will fully turn on while not exceeding a maximum $V_{gs}$ rating of upper FET 302. Accordingly, incorporation of charging control circuitry 502 in half-bridge switching stage 500 helps prevent magnitude of power supply voltage $V_{drv1}$ from falling below a minimum permissible value, such as due to on-resistance of lower FET 304 and/or resistance of current sense resistor 302.

The fact that charging control circuitry 502 helps regulate voltage $V_c$ and/or voltage $V_{drv1}$ by controlling charging of boot-strap capacitor 310 from voltage source 316 may enable voltage $V_s$ of voltage source 316 to be greater than the maximum $V_{gs}$ rating of upper FET 302. For example, in some embodiments, the maximum $V_{gs}$ rating of upper FET 302 is 2.2 volts and voltage $V_s$ is either 3.3 volts or 5 volts.

As another example, in some other embodiments, maximum $V_{gs}$ rating of upper FET 302 is 3.3 volts and voltage $V_s$ is either 5 volts or 12 volts.

FIG. 6 is a graph 600 illustrating an example of operation of one embodiment of charging control circuitry 502. In this embodiment, charging control circuitry 502 is configured to control charging of boot-strap capacitor 310 such that power supply voltage $V_{drv1}$ remains within a range bounded by a minimum value $V_{drv1\_min}$ and a maximum value $V_{drv2\_max}$. At time $t_0$, charging control circuit 502 enables charging of boot-strap capacitor 310 via voltage source 316. At time $t_1$, charging control circuit 502 disables charging of boot-strap capacitor 310 in response to magnitude of power supply voltage $V_{drv1}$ reaching $V_{drv1\_max}$. At time $t_2$, charging control circuit 502 again enables charging of boot-strap capacitor 310 via voltage source 316 in response to power supply voltage $V_{drv1}$ falling to $V_{drv1\_min}$. At time $t_3$, charging control circuit 502 again disables charging of boot-strap capacitor 310 in response to magnitude of power supply voltage $V_{drv1}$ reaching $V_{drv1\_max}$. This process repeats such that power supply voltage $V_{drv1}$ repeatedly transitions between $V_{drv1\_min}$ and $V_{drv1\_max}$. FIG. 6 should not be construed to require any particular shape or frequency of the voltage $V_{drv1}$ waveform. The actual shape and frequency of this waveform are implementation dependent and will also depend on the operating conditions of half-bridge switching stage 500 as well as characteristics of a load (not shown) electrically coupled thereto. Additionally, charging control circuitry 502 could be configured to control charging of boot-strap capacitor 310 via voltage source 316 to regulate voltage $V_c$ across boot-strap capacitor 310, instead of regulating power supply voltage $V_{drv1}$.

Referring again to FIG. 5, while charging control circuitry 502 is configured to help control power supply voltage $V_{drv1}$, or voltage $V_c$ across boot-strap capacitor 310, by controlling charging of boot-strap capacitor 310 from voltage source 316, a maximum permissible value of power supply voltage $V_{drv1}$ may nevertheless be exceeded under certain conditions. For example, assume that current $i_3$ is flowing in the direction indicated in FIG. 5 and that the current is continuously increasing in magnitude. Increasing current $i_3$ will cause $V_{drv1}$ to drop due to voltage drop across current sense resistor 312, as discussed above with respect to EQN. 2. Consequently, charging control circuitry 502 will charge boot-strap capacitor 310 to compensate for voltage drop across current sense resistor 312. Next, assume that current $i_3$ changes direction. Current flowing $i_3$ flowing current sense resistor 312 will increase power supply voltage $V_{drv1}$, instead of decreasing power supply voltage $V_{drv1}$, and boot-strap capacitor 310 will therefore be overcharged for current operating conditions of half-bridge switching stage 500. As a result, power supply voltage $V_{drv1}$ may exceed its maximum permissible value until boot-strap capacitor 310 is sufficiently discharged to reduce magnitude of power supply voltage $V_{drv1}$ to a permissible value.

Clamping circuitry 504 advantageously helps prevents over-voltage of power supply voltage $V_{drv1}$, such as in the aforementioned scenario. In particular, clamping circuitry 504 is configured to clamp magnitude of power supply voltage $V_{drv1}$ (or voltage $V_c$) to prevent the voltage from exceeding a predetermined maximum value, such as a maximum $V_{gs}$ rating of upper FET 302. Clamping circuitry 504 is configured to limit power supply voltage $V_{drv1}$ by conducting sufficient current $i_4$ to partially discharge boot-strap capacitor 310 to a load (not shown) electrically coupled to output node 328, to prevent power supply voltage $V_{drv1}$ from exceeding the predetermined maximum value.

For example, clamping circuitry 504 may partially discharge boot-strap capacitor 310 in response to power supply voltage $V_{drv1}$ crossing a threshold value. Accordingly, charging control circuit 502 and clamping circuitry 504 collectively help ensure that power supply voltage $V_{drv1}$ remains with a specified permissible range.

Figure 7:
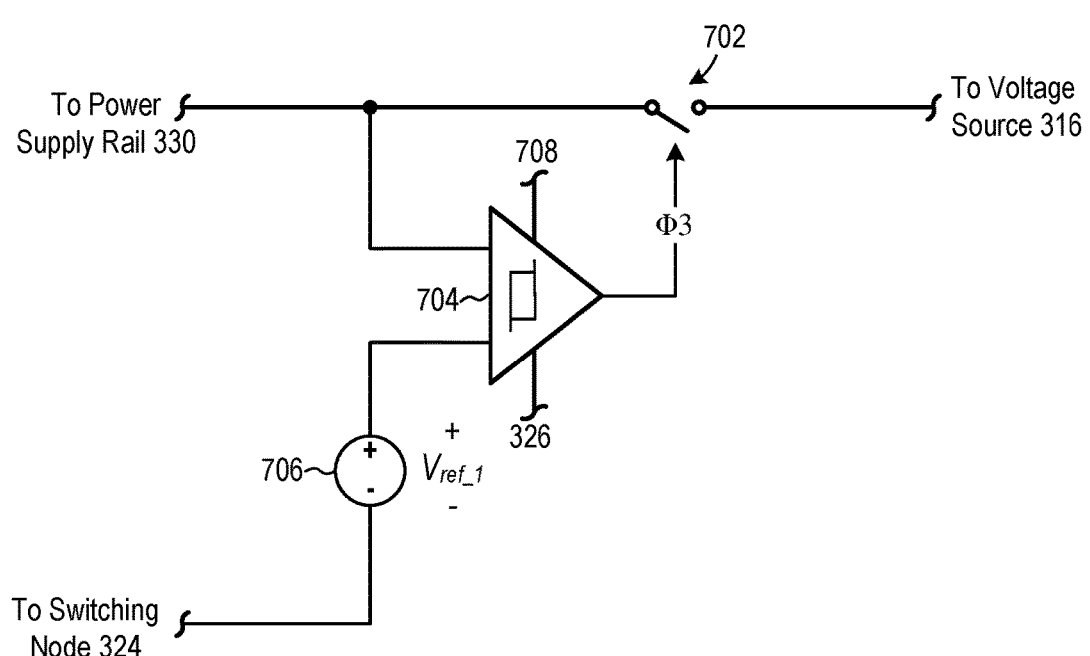
FIG. 7 is a schematic diagram of one embodiment of charging control circuitry of the FIG. 5 half-bridge switching stage.

FIG. 7 is a schematic diagram of charging control circuitry 700, which is one possible embodiment charging control circuitry 502. It is understood, though, that charging control circuitry 502 is not limited to the embodiment of FIG. 7. Instead, charging control circuitry 502 could have other configurations as long as it configured to control charging of boot-strap capacitor 310 via voltage source 316 such that $V_{drv1}$ and/or $V_c$ remain with a predetermined range.

Charging control circuitry 700 includes a switching device 702, a comparator 704, and a reference source 706. Switching device 702 is configured to selectively electrically couple boot-strap capacitor 310 to voltage source 316 to selectively charge boot-strap capacitor 310 via voltage source 316. Specifically, switching device 702 is electrically coupled between voltage source 316 and power supply rail 330, and switching device 702 is controlled by a control signal $\Phi 3$ generated by comparator 704. In some embodiments, switching device 702 includes a transistor, such as a FET or a BJT. Reference source 706 is configured to generate a reference voltage $V_{ref\_1}$. In some embodiments, reference source 706 includes a current source (not shown) configured to drive a current through a resistive device (not shown) to generate $V_{ref\_1}$. Although FIG. 7 depicts reference source 706 as being referenced to switching node 324, reference source 706 could instead be referenced to a different node, e.g., output node 328, without departing from the scope hereof.

Comparator 704 is configured to compare power supply voltage $V_{drv1}$ to $V_{ref\_1}$ and generate control signal $\Phi 3$ in response thereto. Comparator 704 exhibits hysteresis having a value $V_{hyst}$, and comparator 704 is configured to cause switching device 702 to close in response to power supply voltage $V_{drv1}$ crossing, e.g., falling to, a first threshold value $V_{ref\_1}-V_{hyst}$. Additionally, comparator 704 is configured to cause switching device 702 to open in response to power supply voltage $V_{drv1}$ crossing, e.g., rising to, a second threshold value $V_{ref\_1}+V_{hyst}$. As such, charging control circuitry 700 is configured to control charging of boot-strap capacitor 310 such that power supply voltage $V_{drv1}$ remains with a range bounded by $V_{ref\_1}-V_{hyst}$ on the low side and $V_{ref\_1}+V_{hyst}$ on the high side. In an alternate embodiment, comparator 704 compares a scaled version of voltage $V_{drv1}$, such as voltage $V_{drv1}$ divided down by a resistive voltage divider, to $V_{ref\_1}$. FIG. 7 illustrates comparator 704 being powered by a housekeeping power supply rail 708 that is referenced to power node 326, although comparator 704 could be powered in another manner without departing from the scope hereof.

Figure 8:
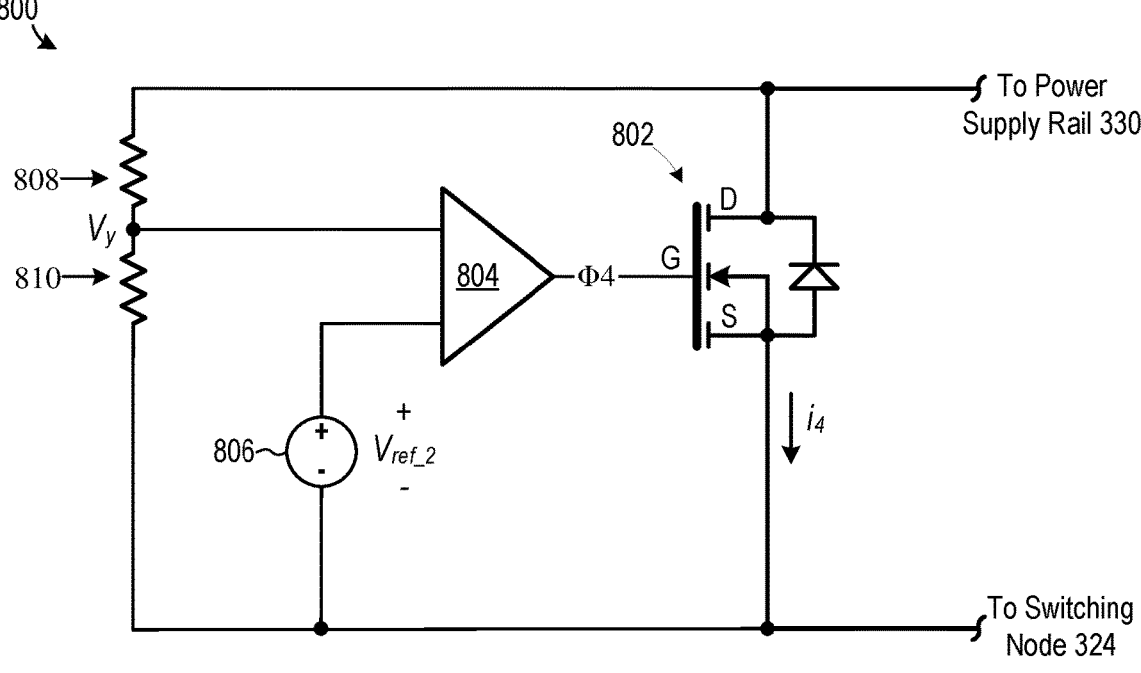
FIG. 8 is a schematic diagram one of embodiment of clamping circuitry of the FIG. 5 half-bridge switching stage.

FIG. 8 is a schematic diagram of clamping circuitry 800, which is one possible embodiment of clamping circuitry 504. It is understood, though, that clamping circuitry 504 is not limited to the embodiment of FIG. 8. Instead, clamping circuitry 800 could have other configurations as long as it configured to limit power supply voltage $V_{drv1}$ by conducting sufficient current $i_4$ to partially discharge boot-strap capacitor 310 to a load (not shown) electrically coupled to output node 328.

Clamping circuitry 800 includes a discharge transistor 802, an error amplifier 804, a reference source 806, a resistor 808, and a resistor device 810. Discharge transistor 802 is a transistor that is configured to partially discharge boot-strap capacitor 310 in response to a signal from error amplifier 804. Discharge transistor 802 is electrically coupled between power supply rail 330 and switching node 324, and discharge transistor 802 is controlled by an error signal Φ4 generated by error amplifier 804. Although discharge transistor 802 is illustrated as being an n-channel FET, discharge transistor 802 could be a different type of transistor, including but not limited to a p-channel FET or a BJT. Additionally, discharge transistor 802 could be replaced with multiple transistors, such as multiple transistors electrically coupled in parallel. Reference source 806 is configured to generate a reference voltage $V_{ref\_2}$. In some embodiments, reference source 806 includes a current source (not shown) configured to drive a current through a resistive device (not shown) to generate $V_{ref\_2}$. Resistors 808 and 810 are electrically coupled in series between power supply rail 330 and switching node 324 to form a voltage divider which generates a voltage $V_y$ at a node where the two resistors are joined. $V_y$ is a scaled version of power supply voltage $V_{drv1}$.

Error amplifier 804 compares voltage $V_y$ to $V_{ref\_2}$ to generate error signal Φ4 and thereby modulate discharge transistor 802 to control magnitude of current $i_4$ to partially discharge boot-strap capacitor 310, such that voltage $V_y$ does not exceed voltage $V_{ref\_2}$. Values of resistors 808 and 810, as well as $V_{ref\_2}$, may be selected so that power supply voltage $V_{drv1}$ does not exceed a predetermined maximum value, e.g., a maximum gate-to-source voltage rating of upper FET 302. In some alternate embodiments, resistors 808 and 810 are omitted, and error amplifier 804 compares power supply voltage $V_{drv1}$ to $V_{ref\_2}$. Clamping circuitry 800 may include additional components, such as additional passive elements to achieve a desired response, e.g., a desired phase margin and/or gain margin, of a closed control loop including error amplifier 804, discharge transistor 802, and boot-strap capacitor 310.

Referring again to FIG. 5, in some embodiments, voltage $V_s$ of voltage source 316 is greater than a maximum gate-to-source voltage rating of upper FET 302, as discussed above. While charging control circuitry 502 and clamping circuitry 504 prevent magnitude of power supply voltage $V_{drv1}$ from exceeding this maximum rating during steady state operation of half-bridge switching stage 500, it is possible that power supply voltage $V_{drv1}$ could exceed the maximum rating under some conditions during start-up of a device including half-bridge switching stage 500. For example, assume a scenario where voltage source 316 becomes active before charging control circuitry 502, during start-up of a device including half-bridge switching stage 500. Under this scenario, a maximum permissible value of power supply voltage $V_{drv1}$ could be exceeded until charging control circuitry 502 becomes active and is thereby capable of controlling charging of boot-strap capacitor 310 from voltage source 316.

Figures 9, 10:
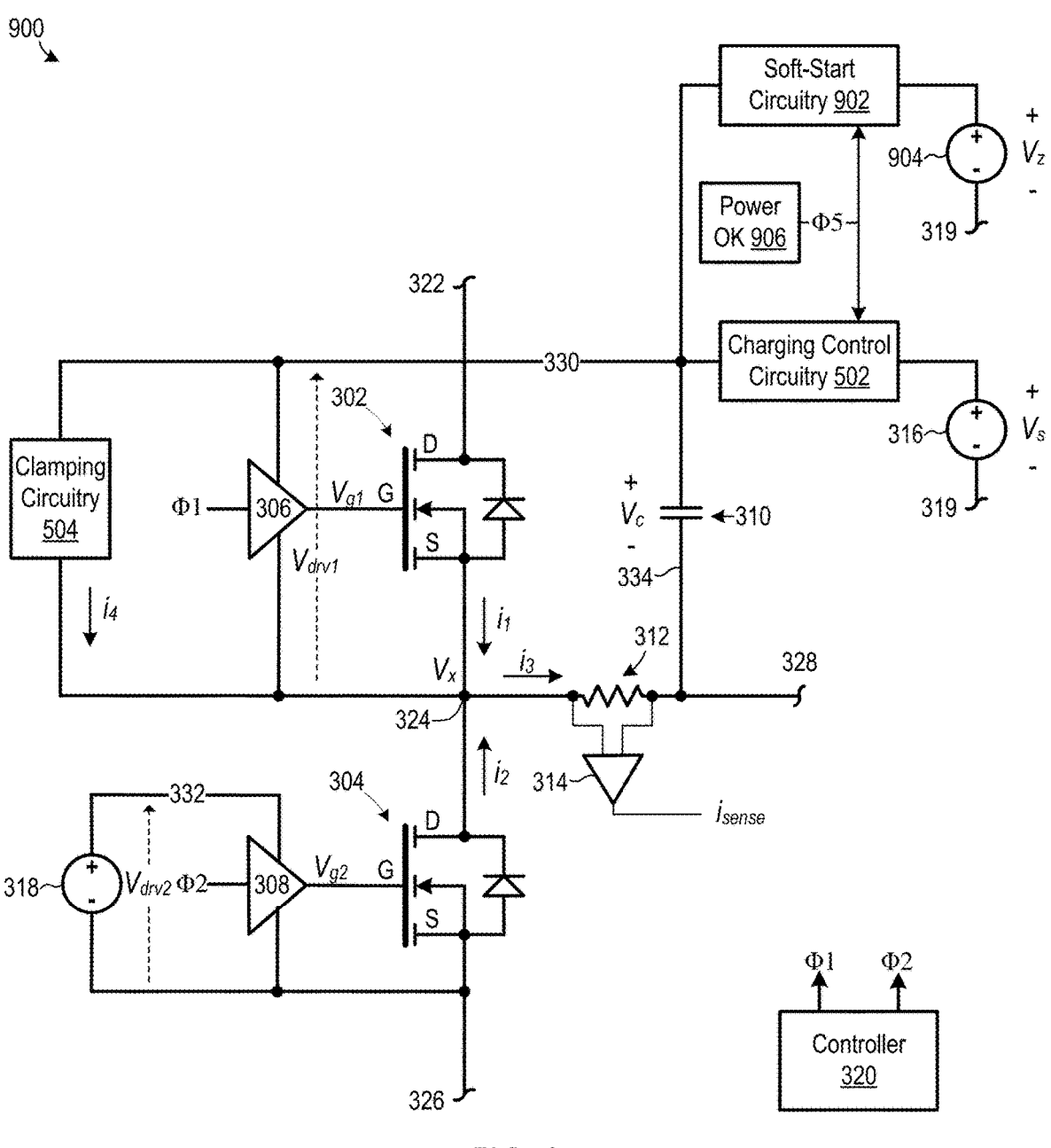
FIG. 9 is a schematic diagram of an alternate embodiment of the FIG. 5 half-bridge switching stage further including soft-start circuitry.
FIG. 10 is a schematic diagram of one embodiment of the soft-start circuitry of the FIG. 9 half-bridge switching stage.

Therefore, some alternate embodiments of half-bridge switching stage 500 further include circuitry to prevent excessive charging of boot-strap capacitor 310 during start-up of a device including the half-bridge switching stage. For example, FIG. 9 is a schematic diagram of a half-bridge switching stage 900 which is an alternate embodiment of half-bridge switching stage 500 further including soft-start circuitry 902. FIG. 9 further depicts a voltage source 904 and power OK circuitry 906, although neither of these elements is necessarily part of half-bridge switching stage 900. Voltage source 904 is configured to generate a voltage $V_z$ having a magnitude that does not exceed a maximum gate-to-source voltage rating of upper FET 302. Additionally, magnitude of voltage $V_z$ is less than magnitude of voltage $V_s$ generated by voltage source 316.

Power OK circuitry 904 is configured to generate a signal Φ5 reflecting at least whether one or more power rails (not shown) used by charging control circuitry 502 are within a range required to ensure proper operation of charging control circuitry 502. For example, referring again to FIG. 7, assume that comparator 704 is powered by housekeeping power supply rail 708. Power OK circuitry 904 may generate a signal Φ5 reflecting whether housekeeping power supply rail 708 is within range required to ensure proper operation of comparator 704. In the FIG. 9 embodiment, signal Φ5 is asserted when the one or more power rails (not shown) used by charging control circuitry 502 are within respective range required to ensure proper operation of charging control circuitry 502. However, power OK circuitry 904 could be configured such that signal Φ5 has a different polarity without departing from the scope hereof. Additionally, signal Φ5 could be one of two or more power status signals generated during start-up of a device incorporating half-bridge switching stage 900. For example, in some embodiments, signal Φ5 is a final signal indicating that one or more power supply rails are within respective regulation ranges.

Soft-start circuitry 902 is configured to charge boot-strap capacitor 310 via voltage source 904 during start-up of a device including half-bridge switching stage 900. Specifically, soft-start circuitry 902 is configured to charge boot-strap capacitor 310 via voltage source 904 when signal Φ5 is de-asserted, and soft start circuitry 902 is configured to disable charging of boot-strap capacitor 310 via voltage source 904 when signal Φ5 is asserted. FIG. 10 is a schematic diagram of soft-start circuitry 1000, which is one possible embodiment of soft-start circuitry 902 of FIG. 9. It is understood, however, that soft-start circuitry 902 could be implemented in other manners. Soft-start circuitry 1000 includes a switching device 1002, e.g., a transistor, electrically coupled between voltage source 904 and power supply rail 330. Switching device 1002 is configured to operate in its closed state when signal Φ5 is de-asserted, and switching device 1002 is configured to operate in its open state when signal Φ5 is asserted.

Referring again to FIG. 9, charging control circuitry 502 is configured in half-bridge switching stage 900 such that it is disabled until signal Φ5 is asserted. For example, switching device 702 of FIG. 7 may be configured to operate in its open state irrespective of the value of control signal Φ3, until control signal Φ5 asserted. After control signal Φ5 is asserted, switching device 702 may be configured to switch according to control signal Φ3.

Accordingly, boot-strap capacitor 310 of half-bridge switching stage 900 is charged via voltage source 904 while signal Φ5 is de-asserted, e.g., during start-up of a device including the switching stage, and boot-strap capacitor 310 is charged via voltage source 316 while signal Φ5 is asserted, e.g., after start-up of the device including the switching stage. Such use of voltage source 904 to charge boot-strap capacitor 310 during times when charging control circuitry 502 is not necessarily operational helps prevent excessively high values of power supply voltage $V_{drv1}$.

Figure 11:
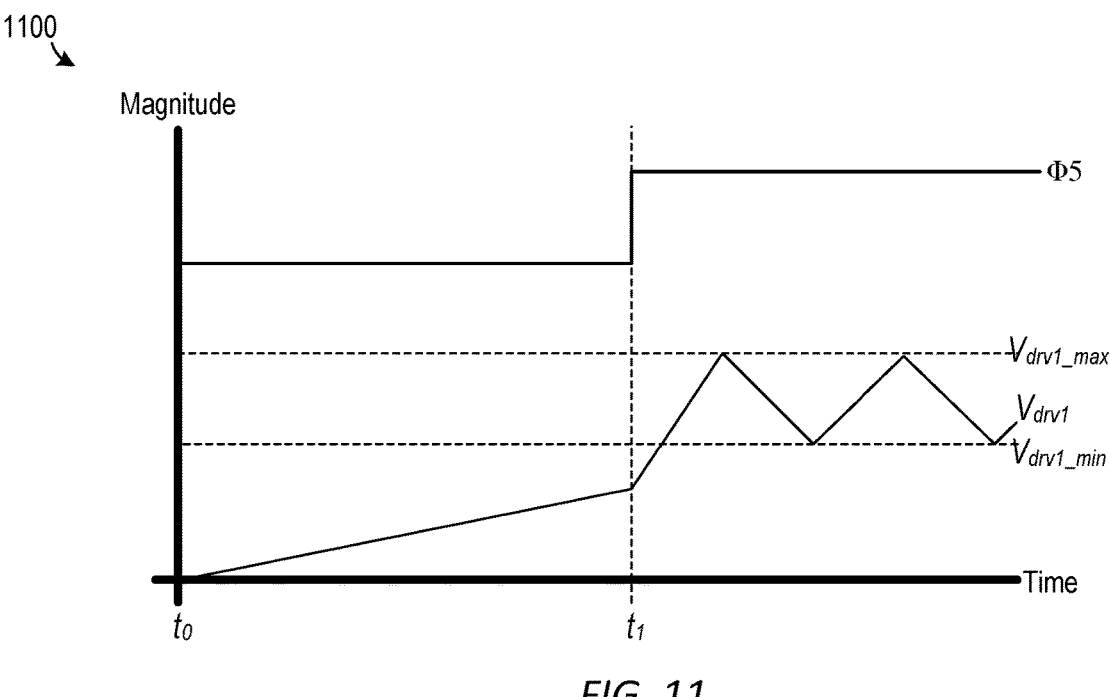
FIG. 11 is a graph illustrating one example of operation of the FIG. 9 half-bridge switching stage during start-up of a device incorporating the switching stage.

FIG. 11 is a graph 1100 illustrating one example of operation of half-bridge switching stage 900 during start-up of a device incorporating the switching stage. Graph 1100 includes a curve representing power supply voltage $V_{drv1}$ as well as a curve representing signal Φ5. The two curves are vertically offset from each other for illustrative clarity. At time $t_0$, the device incorporating switching stage 900 begins to start-up, and one or more power rails used by charging control circuitry 502 are not within respective ranges required to ensure proper operation of charging control circuitry 502. Accordingly, signal Φ5 is de-asserted, soft-start circuitry 902 is enabled, and charging control circuitry 502 is disabled. Consequently, boot-strap capacitor 310 begins charging at a relatively slow rate due to the relatively small magnitude of voltage $V_z$. At time $t_1$, the one or more power rails used by charging control circuitry 502 are within respective ranges required to ensure proper operation of charging control circuitry 502, and power OK circuitry 906 accordingly asserts signal Φ5. In response, soft-start circuitry 902 is disabled, and charging control circuitry 502 is enabled. Charging control circuitry 502 henceforth controls charging of boot-strap capacitor 310 from voltage source 316 such that voltage $V_{drv1}$ remains within a predetermined range bounded by $V_{drv1\_min}$ and $V_{drv1\_max}$, as illustrated in FIG. 11.

FIG. 11 should not be construed to require any particular shape or timing of the voltage $V_{drv1}$ waveform in half-bridge switching stage 900 during start-up of a device incorporating the switching stage. The actual shape and timing of this waveform is implementation dependent and may also depend on characteristics of a device incorporating the switching stage.

Figure 12:
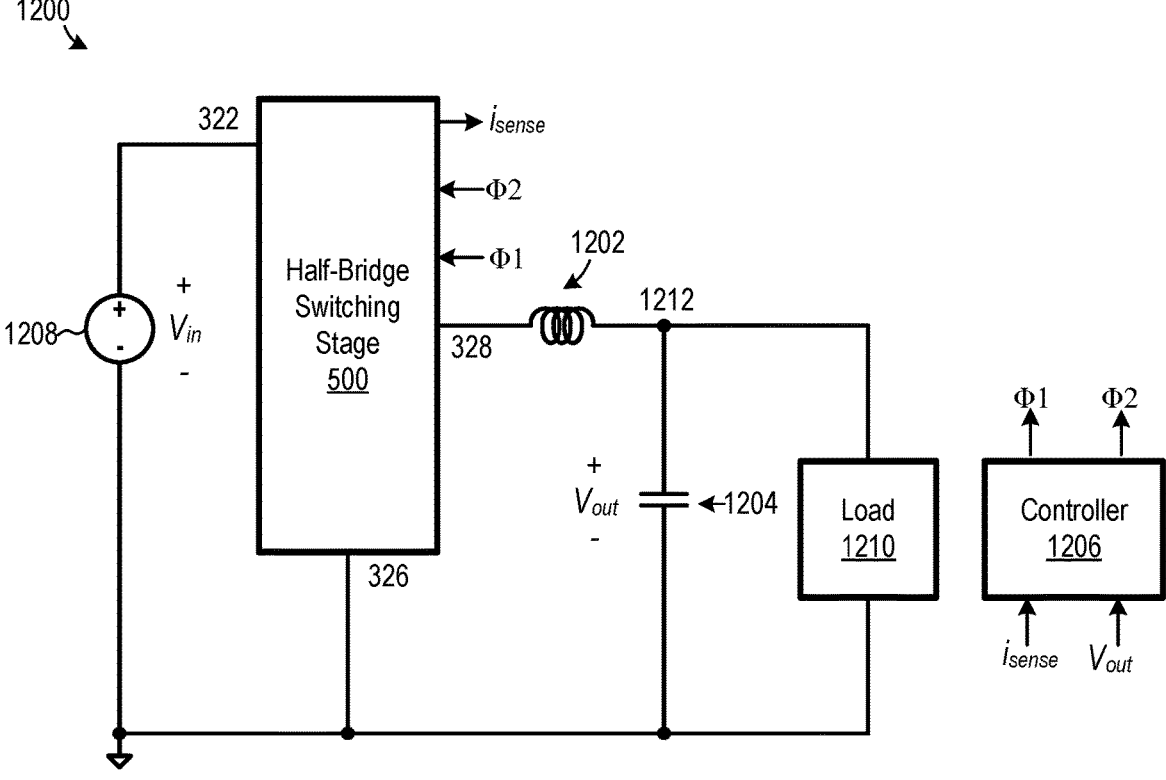
FIG. 12 is a schematic diagram of a direct-current to direct-current converter including an instance of the FIG. 5 half-bridge switching stage, according to an embodiment.
Figure 13:
FIG. 13 is a schematic diagram of a full-bridge converter including two instances of the FIG. 5 half-bridge switching stage, according to an embodiment.
Figure 13:
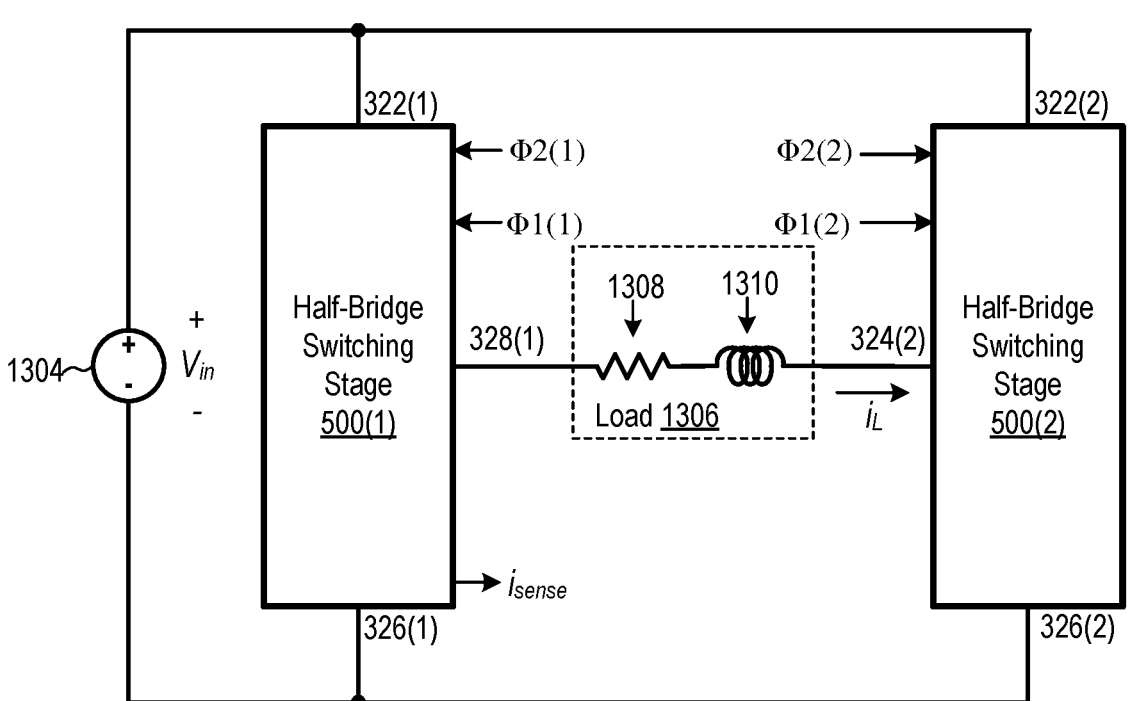
Figure 13:
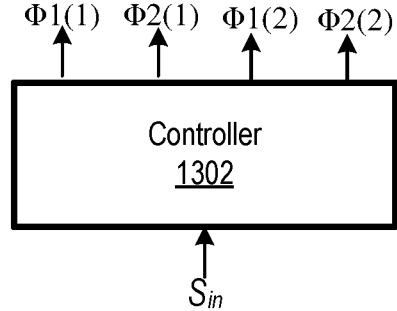
Figure 14:
FIG. 14 is a schematic diagram of a motor drive including three instances of the FIG. 5 half-bridge switching stage, according to an embodiment.

Half-bridge switching stages 500 and 900 may be incorporated into devices including, but not limited to, amplifiers, direct-current to direct-current (DC-to-DC) converters, alternating-current to direct-current (AC-to-DC) converters, inverters, motor drives, and active rectifiers. Discussed below with respect to FIGS. 12-14 are a few example applications of half-bridge switching stages 500 and 900. It is realized, though, that half-bridge switching stages 500 and 900 are not limited to these example applications.

FIG. 12 is a schematic diagram of a DC-to-DC converter 1200 including an instance of half-bridge switching stage 500. Details of half-bridge switching stage 500 are not shown in FIG. 12 for illustrative clarity. DC-to-DC converter 1200 further includes an inductor 1202, a capacitor 1204, and a controller 1206. Additionally, FIG. 12 depicts an input voltage source 1208 and a load 1210, although these two elements are not necessarily part of DC-to-DC converter 1200. Voltage sources 316 and 318 are not shown in FIG. 12, but these voltage sources could be either internal or external to DC-to-DC converter 1200.

Input voltage source 1208 is electrically coupled between power nodes 322 and 326. Accordingly, power node 322 is an input power rail and power node 326 is a ground or reference node. Inductor 1202 is electrically coupled between output node 328 and a loading node 1212. Each of capacitor 1204 and load 1210 is electrically coupled between loading node 1212 and power node 326. Controller 1206 is configured to generate control signals Φ1 and Φ2 to regulate a voltage $V_{out}$ across load 1210. Some embodiments of controller 1206 are configured to operate according to a current mode control scheme, and controller 1206 therefore optionally receives signal $i_{sense}$ from half-bridge switching stage 500, as illustrated in FIG. 12. In certain embodiments, load 1210 includes one or more integrated circuits, including but not limited to, a processing unit (e.g. a central processing unit (CPU) or a graphics processing unit (GPU)), a field programmable gate array (FPGA), an application specific integrated circuit (ASIC) (e.g. for artificial intelligence and/or machine learning), and/or a memory unit.

DC-to-DC converter 1200 has a buck topology, and magnitude of voltage $V_{out}$ across load 1210 is therefore less than or equal to magnitude of voltage $V_{in}$ across input voltage source 1208. However, DC-to-DC converter 1200 could be modified to have a different topology, e.g., a boost topology or a buck-boost topology, while still incorporating one or more instances of half-bridge switching stage 500. Additionally, half-bridge switching stage 500 could be replaced with half-bridge switching stage 900.

FIG. 13 is a schematic diagram of a full-bridge converter 1300 including two instances of half-bridge switching stage 500, i.e., half-bridge switching stage 500(1) and half-bridge switching stage 500(2), as well as a controller 1302. In this document, specific instances of an item may be referred to by use of a numeral in parentheses (e.g., half-bridge switching stage 500(1)) while numerals without parentheses refer to any such item (e.g., half-bridge switching stages 500). FIG. 13 additionally depicts an input voltage source 1304 and a load 1306, although these two elements are not necessarily part of full-bridge converter 1300. Voltage sources 316 and 318 are not shown in FIG. 13, but these voltage sources could be either internal to full-bridge converter 1300 or external to converter 1300. Half-bridge switching stages 500 could be replaced with half-bridge switching stages 900 without departing from the scope hereof.

The power node 322 of each half-bridge switching stage 500 is electrically coupled to a positive node of input voltage source 1304, and the power node 326 of each half-bridge switching stage 500 is electrically coupled to a negative node of input voltage source 1304. Load 1306 is electrically coupled between the output node 328(1) of half-bridge switching stage 500(1) and the switching node 324(2) of half-bridge switching stage 500(2). Current sense resistor 312 is omitted from half-bridge switching stage 500(2), and half-bridge switching stage 500(2) accordingly does not have a power node 328. However, in an alternate embodiment of full-bridge converter 1300 where half-bridge switching stage 500(2) includes an instance of current sense resistor 312, load 1306 is electrically coupled to output node 328(2) of half-bridge switching stage 500(2), instead of being electrically coupled to switching node 324(2) of half-bridge switching stage 500(2). Load 1306 is a resistive-inductive load, as symbolically shown by load 1306 including a lumped resistive element 1308 and a lumped inductive element 1310. Load 1306 includes, for example, an audio speaker or an electric motor.

Controller 1302 is configured to generate (1) control signals Φ1(1) and Φ2(1) to control half-bridge switching stage 500(1) and (2) control signals Φ1(2) and Φ2(2) to control half-bridge switching stage 500(2), in response to an input signal $S_{in}$. Input signal $S_{in}$ is, for example, an audio signal or a motor drive signal. Signal $i_{sense}$ generated by half-bridge switching stage 500(1) is used by one or more systems external to full-bridge converter 1300, such as for dynamic speaker management and/or speaker calibration in embodiments where load 1306 includes an audio speaker.

It should be noted that the inclusion of charging control circuitry 502 and clamping circuitry 504 in half-bridge switching stages 500 may be particularly advantageous in full-bridge converter 1300 due to the bidirectional nature of a load current $I_L$. In particular, the fact that load current $I_L$ may flow in two directions increases risk of both an over-voltage condition and an under-voltage condition on power supply voltage $V_{drv1}$ rail 330. Therefore, inclusion of charging control circuitry 502 and clamping circuitry 504 may be particularly helpful in maintaining magnitude of power supply voltage $V_{drv1}$ within a predetermined permissible range, in full-bridge converter 1300.

FIG. 14 is a schematic diagram of a three-phase motor drive 1400 including three instances of half-bridge switching stage 500, i.e., half-bridge switching stage 500(1), half-bridge switching stage 500(2), and half-bridge switching stage 500(3), as well as a controller 1402. FIG. 14 additionally depicts an input voltage source 1404 and a three-phase electric motor 1406, although these two elements are not necessarily part of motor drive 1400. Voltage sources 316 and 318 are not shown in FIG. 14, but these voltage sources could be either internal to motor drive 1400 or external to motor drive 1400. Half-bridge switching stages 500 could be replaced with half-bridge switching stages 900 without departing from the scope hereof.

The power node 322 of each half-bridge switching stage 500 is electrically coupled to a positive node of input voltage source 1404, and the power node 326 of each half-bridge switching stage 500 is electrically coupled to a negative node of input voltage source 1404. Each phase 1408 of electric motor 1406 is electrically coupled to an output node 328 of a respective half-bridge switching stage 500.

Controller 1402 is configured to generate (1) control signals $\Phi 1(1)$ and $\Phi 2(1)$ to control half-bridge switching stage 500(1), (2) control signals $\Phi 1(2)$ and $\Phi 2(2)$ to control half-bridge switching stage 500(2), and (3) control signals $\Phi 1(3)$ and $\Phi 2(3)$ to control half-bridge switching stage 500(3), in response to an input signal $S_{in}$ and signals $i_{sense}$ from each half-bridge switching stage 500. Input signal $S_{in}$ is, for example, a signal specifying speed, torque, or rotational position of electric motor 1406.

Combinations of Features

Features described above may be combined in various ways without departing from the scope hereof. The following examples illustrate some possible combinations.

(A1) A method for powering driver circuitry for an upper transistor of a half-bridge switching stage includes (1) selectively charging a boot-strap capacitor via a first voltage source such that a voltage at the boot-strap capacitor remains within a predetermined voltage range, (2) clamping the voltage at the boot-strap capacitor to prevent the voltage at the boot-strap capacitor from exceeding a predetermined maximum value, and (3) electrically powering the driver circuitry at least partially via the boot-strap capacitor.

(A2) In the method denoted as (A1), selectively charging the boot-strap capacitor via the first voltage source may include closing a switch electrically coupling the first voltage source to the boot-strap capacitor in response to the voltage at the boot-strap capacitor crossing a first threshold value.

(A3) In the method denoted as (A2), selectively charging the boot-strap capacitor via the first voltage source may further include opening the switch electrically coupling the first voltage source to the boot-strap capacitor in response to the voltage at the boot-strap capacitor crossing a second threshold value.

(A4) In the method denoted as (A3), the second threshold value may be greater than the first threshold value.

(A5) In any one of the methods denoted as (A1) through (A4), clamping the voltage at the boot-strap capacitor may include partially discharging the boot-strap capacitor in response to the voltage at the boot-strap capacitor crossing a threshold value.

(A6) Any one of the methods denoted as (A1) through (A5) may further include charging the boot-strap capacitor via a second voltage source during power-up of a device including the half-bridge switching stage.

(A7) In the method denoted as (A6), a voltage magnitude of the second voltage source may be less than a voltage magnitude of the first voltage source.

In any one of the methods denoted as (A1) through (A7), (1) the upper transistor may include an upper field effect transistor (FET), (2) the boot-strap capacitor may be electrically coupled between charging control circuitry and a source of the upper FET, and (3) the driver circuitry may be configured to drive a gate of the upper FET.

(A9) In the method denoted as (A8), a voltage magnitude of the first voltage source may be greater than a maximum gate-to-source voltage rating of the upper FET.

(A10) Either one of the methods denoted as (A8) and (A9) may further include a current sense resistor electrically coupling the source of the upper FET to a terminal of the boot-strap capacitor.

(A11) In any one of the methods denoted as (A8) through (A10), the upper FET may be an n-channel FET.

(A12) In any one of the methods denoted as (A8) through (A11), the half-bridge switching stage may further include a lower FET, and a drain of the lower FET may be electrically coupled to the source of the upper FET.

(B1) A system for powering driver circuitry for an upper transistor of a half-bridge switching stage includes (1) charging control circuitry configured to selectively charge a boot-strap capacitor of the half-bridge switching stage via a first voltage source such that a voltage at the boot-strap capacitor remains within a predetermined voltage range and (2) clamping circuitry configured to clamp the voltage at the boot-strap capacitor to prevent the voltage at boot-strap capacitor from exceeding a predetermined maximum value.

(B2) In the system denoted as (B1), the charging control circuitry may include (1) a switch configured to selectively electrically couple the boot-strap capacitor to the first voltage source and (2) control circuitry configured to control the switch such that the switch closes and opens in response to the voltage at the boot-strap capacitor crossing first and second threshold values, respectively.

(B3) In either one of the systems denoted as (B1) and (B2), the clamping circuitry may include (1) a discharge transistor configured to at least partially discharge the boot-strap capacitor and (2) control circuitry configured to activate the discharge transistor in response to the voltage at the boot-strap capacitor crossing a threshold value.

(C1) A half-bridge switching stage includes (1) an upper field effect transistor (FET) electrically coupled between a first node and a second node, (2) a lower field effect transistor electrically coupled between the second node and a third node, (3) driver circuitry configured to drive a gate of the upper FET, (4) a boot-strap capacitor electrically coupled to second node and configured to at least partially power the driver circuitry, (5) charging control circuitry configured to selectively charge the boot-strap capacitor via a first voltage source such that a voltage at the boot-strap capacitor remains within a predetermined voltage range, and (6) clamping circuitry configured to clamp the voltage at the boot-strap capacitor to prevent the voltage across the boot-strap capacitor from exceeding a predetermined maximum value.

(C2) The half-bridge switching stage denoted as (C1) may further include soft-start circuitry configured to charge the boot-strap capacitor via a second voltage source during power-up of a device including the half-bridge switching stage.

(C3) In either one of the half-bridge switching stages denoted as (C1) and (C2), the charging control circuitry may include (1) a switch configured to selectively electrically couple the boot-strap capacitor to the first voltage source and (2) control circuitry configured to control the switch such that the switch closes and opens in response to the voltage at the boot-strap capacitor crossing first and second threshold values, respectively.

(C4) In any one of the half-bridge switching stages denoted as (C1) through (C3), (1) a drain of the upper FET may be electrically coupled to the first node, (2) a source of the upper FET may be electrically coupled to the second node, (3) a drain of the lower FET may be electrically coupled to the second node, and (4) a source of the lower FET may be electrically coupled to the third node.

(C5) Any one of the half-bridge switching stages denoted as (C1) through (C4) may further include a current sense resistor electrically coupled between the second node and a fourth node, wherein the boot-strap capacitor is electrically coupled between the charging control circuitry and the fourth node.

Changes may be made in the above methods, devices, and systems without departing from the scope hereof. For example, upper FETs 302 and lower FETs 304 could be implemented by multiple transistors and/or by transistors other than n-channel FETs, with appropriate modifications to the half-bridge switching stages. As another example, half-bridge switching stage 500 could be modified so that one of charging control circuitry 502 and clamping circuitry 504 is omitted. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for powering driver circuitry for an upper transistor of a half-bridge switching stage, comprising:

selectively charging, by a charging control circuit, a boot-strap capacitor by applying a first voltage source to the boot-strap capacitor when a voltage at the boot-strap capacitor is less than a first threshold, and disconnecting the first voltage source to the boot-strap capacitor when the voltage at the boot-strap capacitor exceeds a second threshold, such that the voltage at the boot-strap capacitor remains within a predetermined voltage range between the first threshold and the second threshold;

clamping, by a clamping circuit, the voltage at the boot-strap capacitor to prevent the voltage at the boot-strap capacitor from exceeding a predetermined maximum value, wherein the clamping circuit clamps the voltage at the boot-strap capacitor independent of the charging of the charging control circuit; and electrically powering the driver circuitry at least partially via the boot-strap capacitor to drive the upper transistor of the half-bridge switching stage; and electrically powering the upper transistor of the half-bridge switching stage by applying a second voltage source to the upper transistor of the half-bridge switching stage, the second voltage source being separate from the first voltage source of the charging control circuitry and the clamping circuit.

2. The method of claim 1, wherein selectively charging the boot-strap capacitor via the first voltage source comprises closing a switch electrically coupling the first voltage source to the boot-strap capacitor in response to the voltage at the boot-strap capacitor crossing a first threshold value.

3. The method of claim 2, wherein selectively charging the boot-strap capacitor via the first voltage source further comprises opening the switch electrically coupling the first voltage source to the boot-strap capacitor in response to the voltage at the boot-strap capacitor crossing a second threshold value.

4. The method of claim 3, wherein the second threshold value is greater than the first threshold value.

5. The method of claim 1, wherein clamping the voltage at the boot-strap capacitor comprises partially discharging the boot-strap capacitor in response to the voltage at the boot-strap capacitor crossing a threshold value.

6. The method of claim 1, further comprising charging the boot-strap capacitor via the second voltage source during power-up of a device including the half-bridge switching stage.

7. The method of claim 6, wherein a voltage magnitude of the second voltage source is less than a voltage magnitude of the first voltage source.

8. The method of claim 1, wherein:

the upper transistor comprises an upper field effect transistor (FET);

the boot-strap capacitor is electrically coupled between charging control circuitry and a source of the upper FET; and the driver circuitry is configured to drive a gate of the upper FET.

9. The method of claim 8, wherein a voltage magnitude of the first voltage source is greater than a maximum gate-to-source voltage rating of the upper FET.

10. The method of claim 8, further comprising a current sense resistor electrically coupling the source of the upper FET to a terminal of the boot-strap capacitor.

11. The method of claim 8, where the upper FET is an n-channel FET.

12. The method of claim 8, wherein:

the half-bridge switching stage further includes a lower FET; and a drain of the lower FET is electrically coupled to the source of the upper FET.

13. A system for powering driver circuitry for an upper transistor of a half-bridge switching stage, comprising:

charging control circuitry configured to selectively charge a boot-strap capacitor of the half-bridge switching stage by applying a first voltage source to the boot-strap capacitor when a voltage at the boot-strap capacitor is less than a first threshold, and disconnecting the first voltage source to the boot-strap capacitor when the voltage at the boot-strap capacitor exceeds a second threshold, such that the voltage at the boot-strap capacitor remains within a predetermined voltage range between the first threshold and the second threshold; and clamping circuitry configured to clamp the voltage at the boot-strap capacitor to prevent the voltage at boot-strap capacitor from exceeding a predetermined maximum value, wherein the clamping circuitry clamps the voltage at the boot-strap capacitor independent of the charging of the charging control circuitry, wherein the driver circuitry is powered at least partially via the boot-strap capacitor to drive the upper transistor of the half-bridge switching stage, and wherein the system is configured to electrically power the upper transistor of the half-bridge switching stage by applying a second voltage source separate from the first voltage source of the charging control circuitry and the clamping circuitry to the upper transistor of the half-bridge switching stage.

14. The system of claim 13, wherein the charging control circuitry comprises:

a switch configured to selectively electrically couple the boot-strap capacitor to the first voltage source; and control circuitry configured to control the switch such that the switch closes and opens in response to the voltage at the boot-strap capacitor crossing first and second threshold values, respectively.

15. The system of claim 13, wherein the clamping circuitry comprises:

a discharge transistor configured to at least partially discharge the boot-strap capacitor; and control circuitry configured to activate the discharge transistor in response to the voltage at the boot-strap capacitor crossing a threshold value.

16. A half-bridge switching stage, comprising:

an upper field effect transistor (FET) electrically coupled between a first node and a second node;

a lower field effect transistor electrically coupled between the second node and a third node;

driver circuitry configured to drive a gate of the upper FET;

a boot-strap capacitor electrically coupled to the second node and configured to at least partially power the driver circuitry;

charging control circuitry configured to selectively charge the boot-strap capacitor by applying a first voltage source to the boot-strap capacitor when a voltage at the boot-strap capacitor is less than a first threshold, and disconnecting the first voltage source to the boot-strap capacitor when the voltage at the boot-strap capacitor exceeds a second threshold, such that the voltage at the boot-strap capacitor remains within a predetermined voltage range between the first threshold and the second threshold; and clamping circuitry configured to clamp the voltage at the boot-strap capacitor to prevent the voltage at the boot-strap capacitor from exceeding a predetermined maximum value, wherein the clamping circuitry clamps the voltage at the boot-strap capacitor independent of the charging of the charging control circuitry, wherein the driver circuitry is powered at least partially via the boot-strap capacitor to drive the upper FET of the half-bridge switching stage, and wherein the half-bridge switching stage is configured to electrically power the upper FET of the half-bridge switching stage by applying a second voltage source separate from the first voltage source of the charging control circuitry and the clamping circuitry to the upper FET of the half-bridge switching stage.

17. The half-bridge switching stage of claim 16, further comprising soft-start circuitry configured to charge the boot-strap capacitor via the second voltage source during power-up of a device including the half-bridge switching stage.

18. The half-bridge switching stage of claim 16, wherein the charging control circuitry comprises:

a switch configured to selectively electrically couple the boot-strap capacitor to the first voltage source; and control circuitry configured to control the switch such that the switch closes and opens in response to the voltage at the boot-strap capacitor crossing first and second threshold values, respectively.

19. The half-bridge switching stage of claim 16, wherein:

a drain of the upper FET is electrically coupled to the first node;

a source of the upper FET is electrically coupled to the second node;

a drain of the lower FET is electrically coupled to the second node; and a source of the lower FET is electrically coupled to the third node.

20. The half-bridge switching stage of claim 16, further comprising a current sense resistor electrically coupled between the second node and a fourth node, wherein the boot-strap capacitor is electrically coupled between the charging control circuitry and the fourth node.

* * * * *